US012343987B2

(12) United States Patent
Ono

(10) Patent No.: US 12,343,987 B2
(45) Date of Patent: Jul. 1, 2025

(54) LIQUID EJECTION APPARATUS

(71) Applicant: SEIKO EPSON CORPORATION, Tokyo (JP)

(72) Inventor: Atsushi Ono, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 196 days.

(21) Appl. No.: 18/341,675

(22) Filed: Jun. 26, 2023

(65) Prior Publication Data

US 2023/0415476 A1 Dec. 28, 2023

(30) Foreign Application Priority Data

Jun. 28, 2022 (JP) ................................ 2022-104003

(51) Int. Cl.
*B41J 2/165* (2006.01)
*B41J 2/045* (2006.01)

(52) U.S. Cl.
CPC ......... *B41J 2/0451* (2013.01); *B41J 2/16505* (2013.01); *B41J 2/1652* (2013.01)

(58) Field of Classification Search
CPC .................................................... B41J 2/16508
See application file for complete search history.

(56) References Cited

U.S. PATENT DOCUMENTS

2021/0086517 A1* 3/2021 Nakano .................. B41J 2/0451

FOREIGN PATENT DOCUMENTS

JP 2017-094578 A 6/2017
JP 2021146716 A * 9/2021
JP 7395907 B2 * 12/2023 ............ B41J 2/0451

* cited by examiner

*Primary Examiner* — Sharon Polk
(74) *Attorney, Agent, or Firm* — WORKMAN NYDEGGER

(57) ABSTRACT

A liquid ejection apparatus includes a liquid ejection portion configured to eject a liquid from a plurality of nozzles to perform printing, a liquid mounting portion to which a liquid accommodation portion configured to accommodate a liquid is removably mounted, an image reading portion configured to read an image, and a control portion. The control portion enables use of the image reading portion whether or not the liquid accommodation portion is replaced, in a state in which a liquid accommodation amount of the liquid accommodation portion is less than a liquid threshold value, and there is no possibility of reduction in product quality. The control portion prohibits use of the image reading portion until the liquid accommodation portion is replaced, in a state in which the liquid accommodation amount is less than the liquid threshold value, and there is no possibility of reduction in product quality.

8 Claims, 5 Drawing Sheets

LIQUID EJECTION APPARATUS

The present application is based on, and claims priority from JP Application Serial Number 2022-104003, filed Jun. 28, 2022, the disclosure of which is hereby incorporated by reference herein in its entirety.

BACKGROUND

1. Technical Field

The present disclosure relates to a liquid ejection apparatus such as a printer.

2. Related Art

For example, as in JP-A-2017-094578, there has been proposed a multi-function machine being an example of a liquid ejection apparatus including an image reading device being an example of an image reading portion and a liquid ejection head being an example of a liquid ejection portion. The image reading device reads an image or the like that is printed on a medium. The liquid ejection head ejects a liquid that is supplied from a liquid supply source being an example of a liquid accommodation portion to perform printing on a medium.

In general, in the liquid ejection apparatus, the image reading portion can be used even when printing cannot be performed by the liquid ejection head. However, when use of the image reading portion is allowed in an urgent state that requires measures to be taken, product quality may be reduced.

SUMMARY

In order to solve the above-mentioned problem, a liquid ejection device includes a liquid ejection portion configured to eject a liquid from a plurality of nozzles onto a medium to perform printing, a liquid mounting portion to which a liquid accommodation portion configured to accommodate a liquid to be supplied to the liquid ejection portion is removably mounted, an image reading portion configured to read an image, and a control portion, wherein the control portion enables use of the image reading portion whether or not the liquid accommodation portion is, in a state in which a liquid accommodation amount being an amount of a liquid accommodated in the liquid accommodation portion is less than a liquid threshold value, and there is no possibility of reduction in product quality, and prohibits use of the image reading portion until the liquid accommodation portion is replaced, in a state in which the liquid accommodation amount is less than the liquid threshold value, and there is possibility of reduction in product quality.

In order to solve the above-mentioned problem, a liquid ejection device includes a liquid ejection portion configured to eject a liquid from a plurality of nozzles onto a medium to perform printing, a liquid accommodation portion having a replenishing port for replenishment with a liquid and being configured to accommodate a liquid to be supplied to the liquid ejection portion, an image reading portion configured to read an image, and a control portion, wherein the control portion enables use of the image reading portion whether or not the liquid accommodation portion is replenished with a liquid, in a state in which a liquid accommodation amount being an amount of a liquid accommodated in the liquid accommodation portion is less than a liquid threshold value, and there is no possibility of reduction in product quality, and prohibits use of the image reading portion until the liquid accommodation portion is replenished with a liquid, in a state in which the liquid accommodation amount is less than the liquid threshold value, and there is possibility of reduction in product quality.

In order to solve the above-mentioned problem, a liquid ejection device includes a liquid ejection portion configured to eject a liquid from a plurality of nozzles onto a medium to perform printing, a waste liquid mounting portion on which a waste liquid accommodation portion configured to accommodate a liquid being a waste liquid discharged from the liquid ejection portion is removably mounted, and a control portion, wherein the control portion enables use of the image reading portion whether or not the waste liquid accommodation portion is replaced, in a state in which a waste liquid accommodation amount being an amount of a liquid accommodated in the waste liquid accommodation portion exceeds a waste liquid threshold value, and there is no possibility of reduction in product quality, and prohibits use of the image reading portion until the waste liquid accommodation portion is replaced in a state in which the waste liquid accommodation amount exceeds the waste liquid threshold value, and there is possibility of reduction in product quality.

DESCRIPTION OF EXEMPLARY EMBODIMENTS

First Exemplary Embodiment

Figure 1:
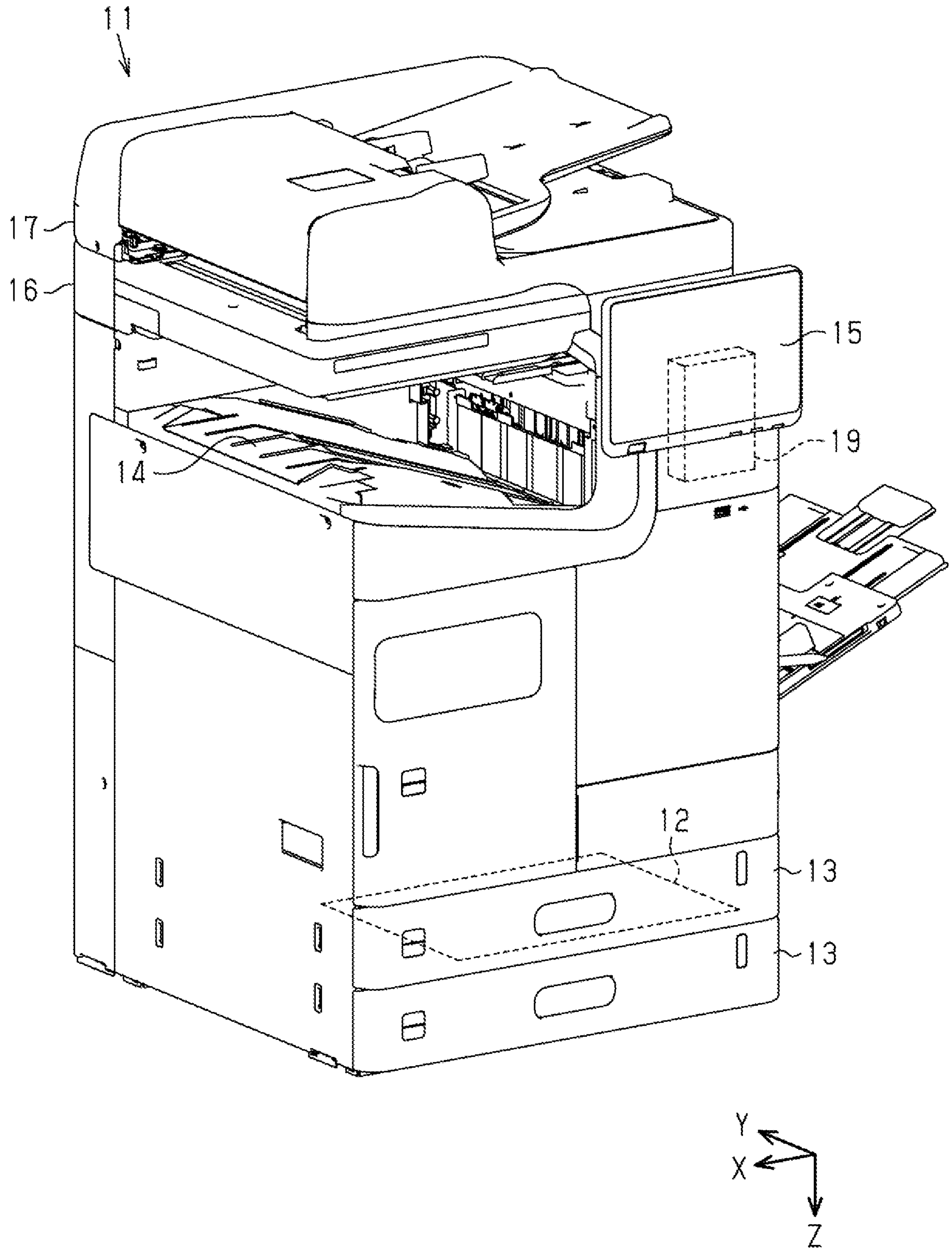
FIG. 1 is a perspective view of a liquid ejection apparatus of a first exemplary embodiment.

With reference to the drawings, a liquid ejection apparatus of a first exemplary embodiment is described below. The liquid ejection apparatus is, for example, an ink-jet printer that ejects ink, which is an example of a liquid, onto a medium such as paper, fabric, vinyl, a plastic part, or a metal part to perform printing on it.

In the drawings, a Z axis represents the direction of gravity, and X and Y axes represent directions along a horizontal plane, assuming that the liquid ejection apparatus 11 is placed on the horizontal plane. The X axis, the Y axis, and the Z axis are orthogonal to one another.

Liquid Ejection Apparatus

As illustrated in FIG. 1, the liquid ejection apparatus 11 may include one or more medium accommodation portions 13 capable of accommodating a medium 12. The liquid ejection apparatus 11 may include a stacker 14 and a selection portion 15. The liquid ejection apparatus 11 includes an image reading portion 16. The liquid ejection apparatus 11 may include an automatic feeding portion 17. The liquid ejection apparatus 11 is coupled to a receptacle, which is omitted in illustration, and thus electric power is supplied thereto.

The medium accommodation portions 13 is a cassette, for example. The medium accommodation portions 13 may accommodate a bundle of the media 12 before printing. The stacker 14 receives the medium 12 after printing.

The selection portion 15 may be a touch panel for operating the liquid ejection apparatus 11, for example. The selection portion 15 of the present exemplary embodiment is capable of selecting a mode while power is off. In other words, the mode during the power-off state is selected through the selection portion 15. In the present exemplary embodiment, selection can be made between a normal mode and an anti-freezing mode as the mode during the power-off state.

The image reading portion 16 is capable of reading an image of a document. The automatic feeding portion 17 feeds a document at a time to the image reading portion 16. The image reading portion 16 may be a sheet-feed type that reads an image of a document fed from the automatic feeding portion 17 in a state in which a light source and a reading portion, which are omitted in illustration, are not in motion. The image reading portion 16 may be a flat-bed type that reads an image of a document set on a document table made of glass, which is omitted in illustration, with a moving light source and a moving reading portion. The image reading portion 16 may include both the sheet-feed type and the flat-bed type.

The liquid ejection apparatus 11 includes a control portion 19. The control portion 19 controls various operations executed in the liquid ejection apparatus 11. The control portion 19 may store a first liquid threshold value, a second liquid threshold value, and a waste liquid threshold value being examples of liquid threshold values. The first liquid threshold value and the second liquid threshold value may be equivalent values, or may be values different from each other.

The control portion 19 may be configured as a circuit including α: one or more processors that perform various processes according to a computer program, β: one or more dedicated hardware circuits that perform at least some of the various processes, or γ: a combination thereof. The hardware circuit is, for example, an application-specific integrated circuit. A processor includes a CPU and a memory such as a RAM and a ROM which stores program code or instructions configured to cause the CPU to perform processes. The memory, that is, a computer-readable medium, includes any readable medium that can be accessed by a general purpose or special purpose computer.

Figure 2:
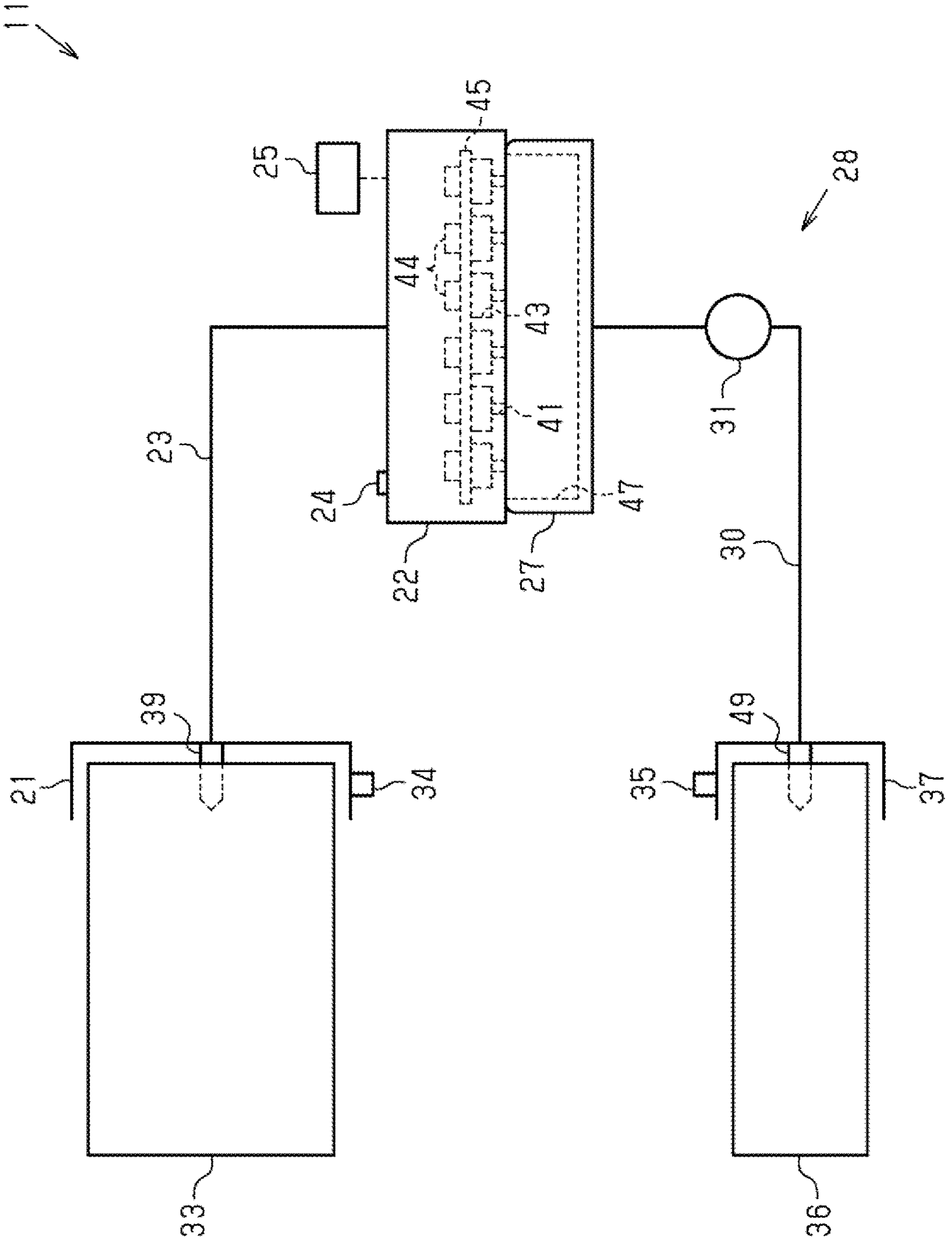
FIG. 2 is a schematic diagram of the liquid ejection apparatus.

As illustrated in FIG. 2, the liquid ejection apparatus 11 includes a liquid mounting portion 21 and a liquid ejection portion 22. The liquid ejection apparatus 11 may include a supply flow path 23, an atmospheric air open valve 24, and an ejection failure detection portion 25. The liquid ejection apparatus 11 may include a cap 27 and a cleaning portion 28. The cleaning portion 28 may include a waste liquid flow path 30 and a suction pump 31.

A liquid accommodation portion 33 is removably mounted to the liquid mounting portion 21. A plurality of liquid accommodation portions 33 may be mounted to the liquid mounting portion 21. A plurality of supply flow paths 23 may be coupled to the liquid mounting portion 21. The liquid accommodation portion 33 accommodates a liquid that is supplied to the liquid ejection portion 22. The liquid ejection apparatus 11 may include a liquid detection portion 34 capable of detecting a liquid accommodation amount being an amount of a liquid accommodated in the liquid accommodation portion 33.

The liquid ejection apparatus 11 may include a waste liquid detection portion 35 capable of detecting a waste liquid accommodation amount. The waste liquid accommodation amount is an amount of a liquid accommodated in a waste liquid accommodation portion 36. The waste liquid accommodation portion 36 is capable of accommodating a liquid being a waste liquid discharged from the liquid ejection portion 22. The liquid ejection apparatus 11 may include a waste liquid mounting portion 37 to which the waste liquid accommodation portion 36 is removably mounted.

The supply flow path 23 may have an upstream end configured as a supply needle 39. The supply needle 39 is provided to the liquid mounting portion 21. The supply needle 39 is inserted into the liquid accommodation portion 33 mounted to the liquid mounting portion 21, and thus is capable of deriving a liquid accommodated in the liquid accommodation portion 33. A downstream end of the supply flow path 23 is coupled to the liquid ejection portion 22. The supply flow path 23 supplies a liquid from the liquid accommodation portion 33 mounted to the liquid mounting portion 21 to the liquid ejection portion 22. The supply flow path 23 may supply a liquid from a water head. The liquid ejection apparatus 11 may include a pump, which is omitted in illustration, for supplying a liquid from the liquid accommodation portion 33 to the liquid ejection portion 22.

The atmospheric air open valve 24 opens a flow path communicating with the nozzle 41 to the atmospheric air. The atmospheric air open valve 24 may be provided to the supply flow path 23, or may be provided to the liquid ejection portion 22.

The liquid ejection portion 22 includes a plurality of nozzles 41. The liquid ejection portion 22 ejects a liquid from the plurality of nozzles 41 onto the medium 12 to perform printing. The liquid ejection portion 22 may be a serial type that ejects a liquid while moving for printing. The liquid ejection portion 22 may be a line type that is provided in an elongated manner in the width direction of the medium 12 and ejects a liquid onto the medium 12 being transported for printing.

The liquid ejection portion 22 may include a plurality of pressure chambers 43, a plurality of actuators 44, and a vibration plate 45.

Each of the pressure chambers 43 communicates with the corresponding nozzle 41. A liquid supplied from the supply flow path 23 is fed to the nozzle 41 via the pressure chamber 43. A part of a wall surface of the pressure chamber 43 is formed of the vibration plate 45.

The actuator 44 is provided to a surface opposite to a portion of the vibration plate 45, which faces the pressure chamber 43. The actuator 44 of the present exemplary embodiment is configured as a piezoelectric element that contracts at the time of application of a driving voltage. The contracting actuator 44 deforms the vibration plate 45. When application of a driving voltage is canceled, the actuator 44 changes a volume of the pressure chamber 43, and thus a liquid inside the pressure chamber 43 is ejected as a liquid droplet from the nozzle 41.

The actuator 44 causes flexure deformation of the vibration plate 45. The vibration plate 45 is deformed, and thus a pressure variation is caused in the pressure chamber 43. With this variation, the vibration plate 45 vibrates for a certain period of time. The vibration is referred to as residual vibration.

The ejection failure detection portion 25 may detect the pressure chamber 43 and the nozzle 41 communicating with the pressure chamber 43 from a residual vibration state. The ejection failure detection portion 25 of the present exemplary embodiment is a circuit that detects a vibration waveform of the pressure chamber 43, and thus detects a state inside the pressure chamber 43. The ejection failure detection portion 25 is capable of detecting an ejection failure of the plurality of nozzles 41.

An ejection failure indicates a state in which a liquid is not ejected from the nozzle 41, or, even when a liquid is ejected, an amount of a liquid droplet is small or the liquid droplet does not impact at a target position due to a deviated flying direction. An ejection failure is caused by increase in liquid viscosity, mixing of air bubbles, or fixing of a foreign object. In the present exemplary embodiment, it is assumed that the nozzle 41 from which an ejection failure is detected is a failure nozzle and the nozzle 41 from which an ejection failure is not detected is a normal nozzle.

When the ejection failure detection portion 25 detects the failure nozzle, the control portion 19 may execute complement printing for ejecting a liquid from the normal nozzle in place of the failure nozzle. During complement printing, a liquid to be ejected from the failure nozzle can be complemented by increasing a size of a liquid droplet ejected from the normal nozzle in the periphery thereof. For example, when an ejection failure occurs to the nozzle 41 that ejects black ink, liquid droplets of yellow, cyan, and magenta are jetted in an overlapping manner at a position at which a liquid droplet that is originally ejected from the failure nozzle impacts. With this, a missing dot of black ink can be complemented.

The cap 27 is capable of receiving a liquid discharged from the nozzle 41. The cap 27 may be provided so as to be movable between a contact position illustrated in FIG. 2 and a separation position omitted in illustration.

The contact position is a position at which the cap 27 contacts with the liquid ejection portion 22. The cap 27 at the contact position forms a space 47 in which the plurality of nozzles 41 are opened. Formation of the space 47 by the cap 27 surrounding the nozzle 41 is also referred to as capping.

The separation position is a position at which the cap 27 is separated away from the liquid ejection portion 22. The cap 27 opens the space 47 by moving from the contact position to the separation position. In other words, the cap 27 at the separation position does not form the space 47. The cap 27 at the separation position may receive a liquid ejected from the liquid ejection portion 22. Maintenance in which a liquid is ejected from the liquid ejection portion 22 is also referred to as flushing.

The waste liquid flow path 30 may have a downstream end configured as a discharge needle 49. An upstream end of the waste liquid flow path 30 is coupled to the cap 27, and a downstream end thereof is provided to the waste liquid mounting portion 37. The discharge needle 49 is inserted into the waste liquid accommodation portion 36 mounted to the waste liquid mounting portion 37, and thus is capable of discharging a liquid to the waste liquid accommodation portion 36. The suction pump 31 is capable of reducing a pressure in the cap 27 via the waste liquid flow path 30.

The cleaning portion 28 forcefully discharges a liquid from the plurality of nozzles 41 via the space 47, and thus is capable of executing cleaning. The cleaning portion 28 of the present exemplary embodiment drives the suction pump 31 in a state in which the cap 27 is at the contact position, and thus executes cleaning. In other words, the cleaning portion 28 reduces a pressure in the space 47. With this, a liquid is discharged from the nozzle 41, and a liquid is supplied to the liquid ejection portion 22 through the supply flow path 23.

The cleaning portion 28 may reduce a pressure in the space 47 in a state in which the nozzle 41 is not filled with a liquid, and thus may fill the nozzle 41 with a liquid.

The cleaning portion 28 drives the suction pump 31 in a state in which the cap 27 is at the separation position, and thus discharges a liquid in the cap 27. Maintenance for feeding a liquid in the cap 27 to the waste liquid accommodation portion 36 is also referred to as idle suction.

Figure 3:
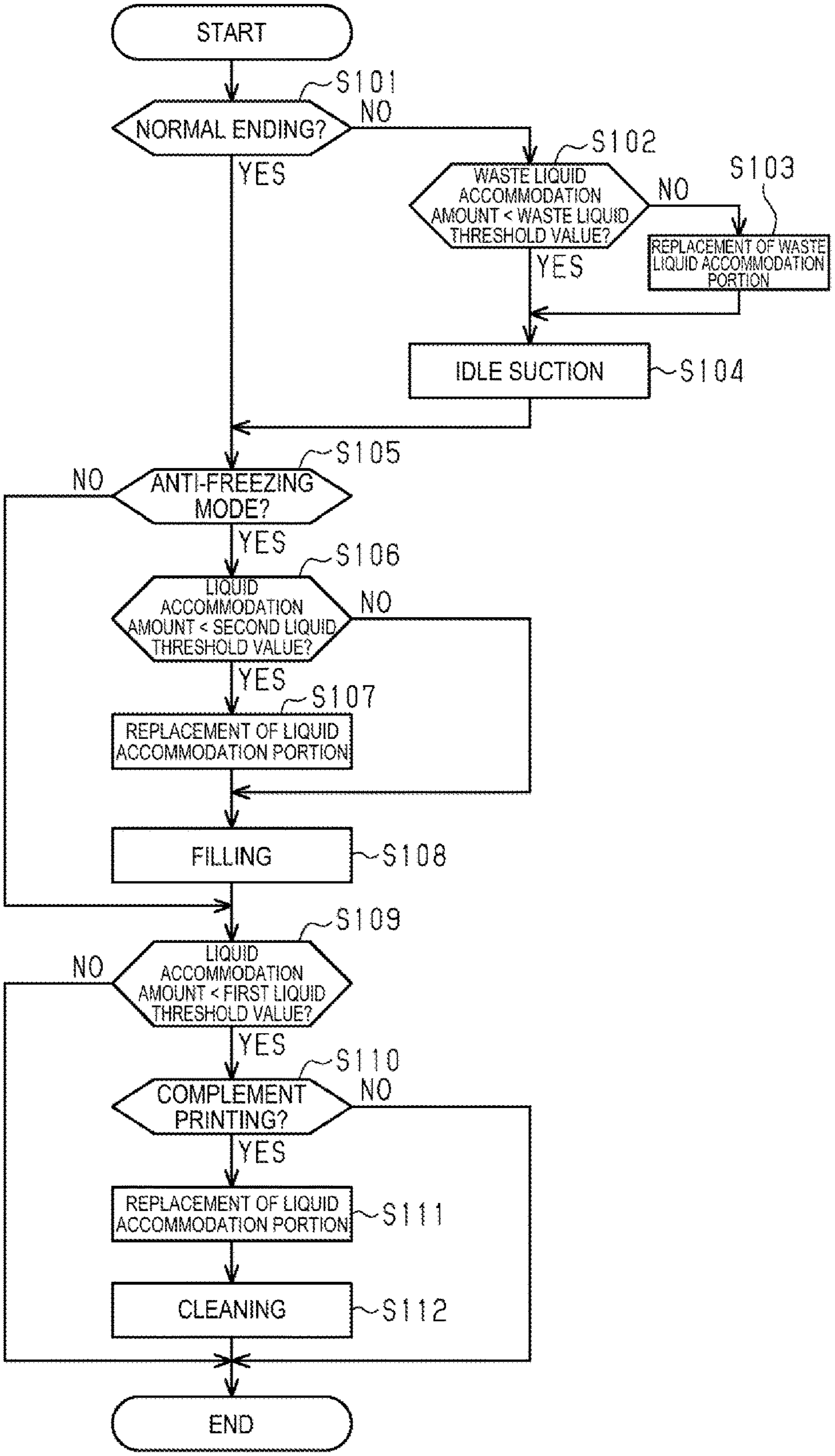
FIG. 3 is a flowchart illustrating a maintenance routine.

Next, with reference to the flowchart illustrated in FIG. 3, a maintenance routine is described. The maintenance routine is executed at timing when the power source of the liquid ejection apparatus 11 is turned on. During execution of the maintenance routine, the control portion 19 prohibits use of the image reading portion 16.

As illustrated in FIG. 3, in Step S101, the control portion 19 determines whether the liquid ejection apparatus 11 is normally ended at the time of the previous power-off. In a case of normal ending, which is YES in Step S101, the control portion 19 shifts the processing to Step S105. For example, when the liquid ejection apparatus is unplugged in the middle of execution of cleaning of the cleaning portion 28, which is NO in Step S101, the control portion 19 shifts the processing to Step S102.

In Step S102, the control portion 19 compares the waste liquid accommodation amount and the waste liquid threshold value with each other. When the waste liquid accommodation amount does not exceed the waste liquid threshold value, which is YES in Step S102, the control portion 19 shifts the processing to Step S104. When the waste liquid accommodation amount exceeds the waste liquid threshold value, which is NO in Step S102, the control portion 19 shifts the processing to Step S103.

In Step S103, the control portion 19 causes the waste liquid accommodation portion 36 to be replaced. Specifically, the control portion 19 instructs a user to replace the waste liquid accommodation portion 36, and stands by until the waste liquid accommodation portion 36 is replaced.

In Step S104, the control portion 19 causes the cleaning portion 28 to execute idle suction. In Step S102, whether the waste liquid accommodation amount exceeds the waste liquid threshold value or not may be determined while considering an amount of a liquid discharged through idle suction in Step S104 in advance.

In Step S105, the control portion 19 confirms the mode during the power-off state. When the normal mode is selected, which is NO in Step S105, the control portion 19 shifts the processing to Step S109. When the anti-freezing mode is selected, which is YES in Step S105, the control portion 19 shifts the processing to Step S106.

In Step S106, the control portion 19 compares the liquid accommodation amount and the second liquid threshold value with each other. The second liquid threshold value is an example of a liquid threshold value. When the liquid accommodation amount is not less than the second liquid threshold value, which is NO in Step S106, the control portion 19 shifts the processing to Step S108. When the liquid accommodation amount is less than the second liquid threshold value, which is YES in Step S106, the control portion 19 shifts the processing to Step S107.

In Step S107, the control portion 19 causes the liquid accommodation portion 33 to be replaced. Specifically, the control portion 19 instructs a user to replace the liquid accommodation portion 33, and stands by the liquid accommodation portion 33 is replaced.

In Step S108, the control portion 19 fills the nozzle 41 with a liquid. In Step S106, whether the liquid accommodation amount is less than the second liquid threshold value or not may be determined while considering an amount of a liquid consumed for filling in Step S108 in advance.

In Step S109, the control portion 19 compares the liquid accommodation amount and the first liquid threshold value with each other. The first liquid threshold value is an example of a liquid threshold value. When the liquid accommodation amount is not less than the first liquid threshold value, which is NO in Step S109, the control portion 19 terminates the processing. When the liquid accommodation amount is less than the first liquid threshold value, which is YES in Step S109, the control portion 19 shifts the processing to Step S110.

In Step S110, the control portion 19 determines whether complement printing is executed. When complement printing is not executed, which is NO in Step S110, the control portion 19 terminates the processing. When complement printing is executed, which is YES in Step S110, the control portion 19 shifts the processing to Step S111.

In Step S111, similarly to Step S107, the control portion 19 causes the liquid accommodation portion 33 to be replaced. In Step S112, the control portion 19 causes the cleaning portion 28 to execute cleaning, and then completes the maintenance routine. When the maintenance routine is completed, the control portion 19 allows use of the image reading portion 16. In Step S109, whether the liquid accommodation amount is smaller than the first liquid threshold value or not may be determined while considering an amount of a liquid consumed for cleaning in Step S112 in advance.

Operation of First Exemplary Embodiment

The operation of the present exemplary embodiment is described.

When the liquid ejection apparatus is unplugged in the middle of execution of cleaning of the cleaning portion 28, which corresponds to abnormal ending, a liquid may remain in the cap 27 in some cases. When the image reading portion 16 is used in a state in which a liquid remains in the cap 27, the liquid in the cap 27 leaks due to vibration, which may cause a risk of reduction in product quality. In other words, a state of unsuccessful completion is an example of a state in which there is possibility of reduction in product quality.

In a case in which normal ending is not performed, and then the power source is turned on, when the waste liquid accommodation amount does not exceed the waste liquid threshold value, the control portion 19 may execute idle suction. In other words, the control portion 19 may enable use of the image reading portion 16 after executing an operation of discharging a liquid from the cap 27. The waste liquid threshold value may be a value obtained by subtracting an amount of a liquid that can be accommodated in the cap 27 from a maximum accommodation value by which the waste liquid accommodation portion 36 can accommodate a liquid.

In a case in which the waste liquid accommodation amount exceeds the waste liquid threshold value, when a liquid is discharged from the cap 27, there may be a risk that the liquid leaks from the waste liquid accommodation portion 36. In a case in which normal ending is not performed, and then the power source is turned on, when the waste liquid accommodation amount exceeds the waste liquid threshold value, the control portion 19 may prohibit use of the image reading portion 16 until the waste liquid accommodation portion 36 is replaced. In a state in which the waste liquid accommodation amount exceeds the waste liquid threshold value and there is possibility of reduction in product quality, the control portion 19 may prohibit use of the image reading portion 16 until the waste liquid accommodation portion 36 is replaced. When the waste liquid accommodation portion 36 is replaced, the control portion 19 may execute idle suction, discharge a liquid in the cap 27, and then enables use of the image reading portion 16.

A state of normal ending is an example of a state in which there is no possibility of reduction in product quality. When the power source is turned on after normal ending, in a state in which the waste liquid accommodation amount exceeds the waste liquid threshold value and there is no possibility of reduction in product quality, the control portion 19 may enable use of the image reading portion 16 whether or not the waste liquid accommodation portion 36 is replaced. In a state in which there is no possibility of reduction in product quality, the control portion 19 may enable use of the image reading portion 16 regardless of the waste liquid accommodation amount.

When the power source is turned off in a state in which the normal mode is selected, the control portion 19 turns off power in a state in which the cap 27 is at the contact position. In other words, the cap 27 subjects the liquid ejection portion 22 to capping. Thus, vaporization of a liquid in the nozzle 41 is suppressed.

When the anti-freezing mode is selected, the control portion 19 first causes the cleaning portion 28 to discharge a liquid in the plurality of nozzles 41. Specifically, the control portion 19 drives the suction pump 31 in a state in which the atmospheric air open valve 24 is opened and the cap 27 is at the contact position. After that, the control portion 19 moves the cap 27 at the separation position at which the space 47 is not formed, and then turns off power. The control portion 19 may move the cap 27 from the contact position to the separation position in a state in which the suction pump 31 is stopped. The control portion 19 may execute power-off after executing idle suction and causing the waste liquid accommodation portion 36 to discharge a remaining liquid in the cap 27.

For example, a liquid in the nozzle 41 is frozen in a state in which the space 47 is formed. In this case, there is a risk of applying an excessing pressure to the liquid ejection portion 22 due to the expanded liquid. Thus, a liquid inside the nozzle 41 is discharged in advance, and the cap 27 is away from the liquid ejection portion 22. Thus, a risk of applying an excessing pressure to the liquid ejection portion 22 can be lowered.

When the liquid accommodation amount is not less than the second liquid threshold value after the anti-freezing mode is selected, the power source is turned off, and then the power source is subsequently turned on, the control portion 19 may enable use of the image reading portion 16 after filling the nozzle 41 with a liquid. The second liquid threshold value may be an amount of a liquid required for filling the nozzle 41 with the liquid.

When the nozzle 41 is filled with a liquid in a state in which the liquid accommodation amount is less than the second liquid threshold value, a liquid to be supplied from the liquid accommodation portion 33 to the liquid ejection portion 22 is insufficient, and the nozzle 41 cannot be filled with the liquid. When vibration generated from, for example, use of the image reading portion 16 is applied in a state in which filling with the liquid cannot be performed, an air enters the liquid ejection portion 22 through the nozzle 41, which may cause a risk of reduction in product quality. In other words, a state in which the nozzle 41 cannot be filled with a liquid corresponds to a state in which there is possibility of reduction in product quality.

When the liquid accommodation amount is less than the second liquid threshold value after the anti-freezing mode is selected, the power source is turned off, and then the power source is subsequently turned on, the control portion 19 may prohibit use of the image reading portion 16 until the liquid accommodation portion 33 is replaced. In a state in which the liquid accommodation amount is less than the second liquid threshold value and there is possibility of reduction in product quality, the control portion 19 prohibits use of the image reading portion 16 until the liquid accommodation portion 33 is replaced.

A state in which the normal mode is selected and the power source is turned off corresponds to a state in which there is no possibility of reduction in product quality. When the normal mode is selected, the power source is turned off, and then the power source is subsequently turned on, the control portion 19 may enable use of the image reading portion 16 regardless of the liquid accommodation amount. In a state in which the liquid accommodation amount is less than the second liquid threshold value and there is no possibility of reduction in product quality, the control portion 19 enables use of the image reading portion 16 whether or not the liquid accommodation portion 33 is replaced.

Complement printing is executed when an ejection failure is detected. Thus, when complement printing is executed, the failure nozzle is present. Appropriate maintenance work is not performed in a state in which the failure nozzle is present, it is difficult to restore the failure nozzle, which may cause a risk of reduction in product quality. In other words, a state of executing complement printing corresponds to a state in which there is possibility of reduction in product quality.

In a state in which complement printing is executed, and the liquid accommodation amount is less than the first liquid threshold value, the control portion 19 may prohibit use of the image reading portion 16 until the liquid accommodation portion 33 is replaced. For example, the first liquid threshold value may be an amount of a liquid consumed for cleaning. In a state in which the liquid accommodation amount is less than the first liquid threshold value and there is possibility of reduction in product quality, the control portion 19 prohibits use of the image reading portion 16 until the liquid accommodation portion 33 is replaced.

In a state in which complement printing is not executed, maintenance work for the failure nozzle is not required. In other words, a state in which complement printing is not executed corresponds to a state in which there is no possibility of reduction in product quality. In a state in which complement printing is not executed, and the liquid accommodation amount is less than the first liquid threshold value, the control portion 19 may enable use of the image reading portion 16 whether or not the liquid accommodation portion 33 is replaced. In other words, in a state in which the liquid accommodation amount is less than the liquid threshold value and there is no possibility of reduction in product quality, use of the image reading portion 16 is enabled whether or not the liquid accommodation portion 33 is replaced.

Effects of First Exemplary Embodiment

Advantages of the present exemplary embodiment are described.

(1) In a state in which there is possibility of reduction in product quality, the control portion 19 prohibits use of the image reading portion 16 until the liquid accommodation portion 33 is replaced. When the liquid accommodation portion 33 is replace, measured can be taken against possibility of reduction in product quality. Therefore, a risk of reduction in product quality can be lowered.

(2) When the failure nozzle is detected, the control portion 19 executes complement printing. Thus, a state in which complement printing is executed is also a state in which an ejection failure is detected. It is difficult to restore a nozzle from an ejection failure over time. Thus, when the image reading portion 16 is used in a state in which an ejection failure is detected, there may be a risk of reduction in product quality. In view of this, when complement printing is executed, the control portion 19 prohibits use of the image reading portion 16 until the liquid accommodation portion 33 is replaced. Therefore, measures against an ejection failure of the nozzle 41 can be taken before the image reading portion 16 is used.

(3) When the anti-freezing mode is selected, a liquid in the nozzle 41 is discharged, and then the power source is turned off. For example, when the image reading portion 16 is used in a state in which a liquid in the nozzle 41 is discharged, an air enters the liquid ejection portion 22 through the nozzle 41 due to, for example, vibration. With this, there may be caused a risk of reduction in product quality. In view of this, in a case in which the power source is turned on in the anti-freezing mode, when the liquid accommodation amount is less than the second liquid threshold value, the control portion 19 prohibits use of the image reading portion 16 until the liquid accommodation portion 33 is replaced. Therefore, a risk of applying vibration to the liquid ejection portion 22 in a state in which the nozzle 41 is filled with a liquid can be lowered.

(4) A waste liquid may be generated while taking measures against possibility of reduction in product quality. In view of this, when the waste liquid accommodation amount exceeds the waste liquid threshold value, the control portion 19 prohibits use of the image reading portion 16 until the waste liquid accommodation portion 36 is replaced. Therefore, a risk that a waste liquid flows out from the waste liquid accommodation portion 36 can be lowered.

(5) When the liquid ejection apparatus is unplugged in the middle of execution of cleaning, a liquid may remain in the cap 27 in some cases. When the image reading portion 16 is used in a state in which a liquid remains in the cap 27, there may be a risk of liquid leakage due to vibration. In view of this, when the waste liquid accommodation amount does not exceed the waste liquid threshold value when the power is turned on, the control portion 19 discharges a liquid from the cap 27. When the waste liquid accommodation amount exceeds the waste liquid threshold value, use of the image reading portion 16 is prohibited until the waste liquid accommodation portion 36 is replaced. Therefore, a risk that a liquid leaks from the cap 27 can be lowered.

Second Exemplary Embodiment

Next, a liquid ejection apparatus of a second exemplary embodiment is described below with reference to the drawings. Note that the second exemplary embodiment is different from the first exemplary embodiment in the configuration of the liquid accommodation portion. Further, the other points are substantially the same as those of the first exemplary embodiment. Thus, the configurations having the same functions are denoted with the same reference symbols, and overlapping description thereof is omitted.

Figure 4:
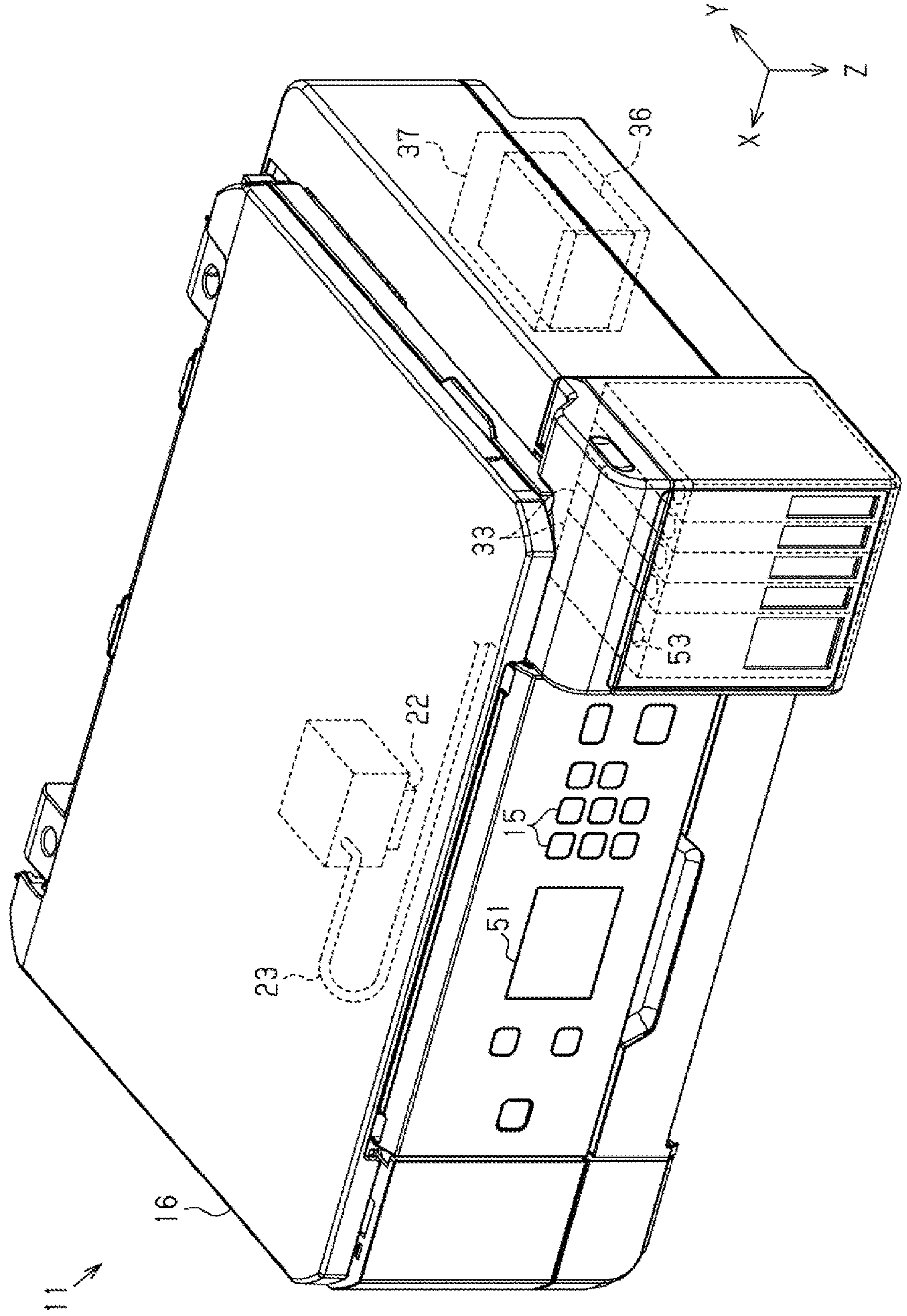
FIG. 4 is a perspective view of a liquid ejection apparatus of a second exemplary embodiment.

As illustrated in FIG. 4, the liquid ejection apparatus 11 may include the image reading portion 16 of a flat-bed type.

The selection portion 15 may be a button. The liquid ejection apparatus 11 may include a display portion 51 that displays information relating to the liquid ejection apparatus 11, for example. A user may select the mode during the power-off state by operating the selection portion 15 while viewing the display of the display portion 51.

The liquid ejection apparatus 11 includes the liquid accommodation portion 33 that accommodates a liquid supplied to the liquid ejection portion 22. The liquid accommodation portion 33 has a replenishing port 53 that enables replenishment with a liquid. The liquid ejection apparatus 11 may include the plurality of liquid accommodation portions 33.

Figure 5:
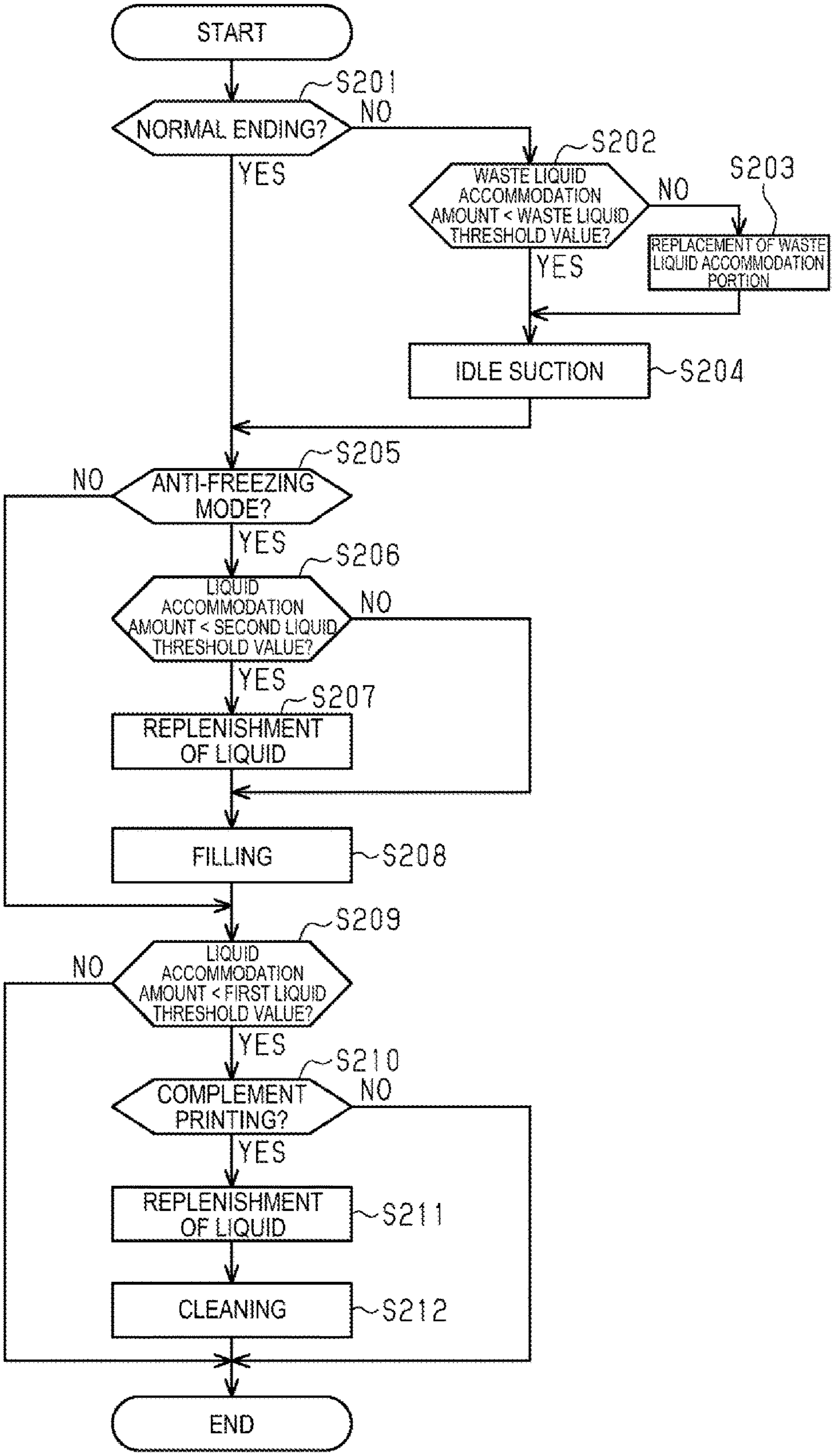
FIG. 5 is a flowchart illustrating a maintenance routine.

Next, with reference to the flowchart illustrated in FIG. 5, a maintenance routine is described. The maintenance routine is executed at timing when the power source of the liquid ejection apparatus 11 is turned on. During execution of the maintenance routine, the control portion 19 prohibits use of the image reading portion 16.

As illustrated in FIG. 5, Step S201 to Step S212 are substantially the same as Step S101 to Step S112 illustrated in FIG. 3, and Step S207 to Step S211 are different from Step S107 to Step S111.

In Step S207 and Step S211, the control portion 19 executes similar processing. In other words, the control portion 19 causes the liquid accommodation portion 33 to be replenished with a liquid. Specifically, the control portion 19 instructs a user to replenish the liquid accommodation portion 33 with a liquid, and stands by until replenishment with a liquid is completed.

In Step S202, whether the waste liquid accommodation amount exceeds the waste liquid threshold value or not may be determined while considering an amount of a liquid discharged through idle suction in Step S204 in advance.

In Step S206, whether the liquid accommodation amount is less than the second liquid threshold value or not may be determined while considering an amount of a liquid consumed for filling in Step S208 in advance.

In Step S209, whether the liquid accommodation amount is smaller than the first liquid threshold value or not may be determined while considering an amount of a liquid consumed for cleaning in Step S212 in advance.

Operation of Second Exemplary Embodiment

The operation of the present exemplary embodiment is described.

Replacement of the waste liquid accommodation portion 36, the power-off methods depending on the modes, and complement printing are similar to those in the first exemplary embodiment.

When the liquid accommodation amount is not less than the second liquid threshold value after the power source is turned off in the anti-freezing mode, and then the power source is subsequently turned on, the control portion 19 may enable use of the image reading portion 16 after filling the nozzle 41 with a liquid. When the liquid accommodation amount is less than the second liquid threshold value after the power source is turned off in the anti-freezing mode, and then the power source is subsequently turned on, the control portion 19 may prohibit use of the image reading portion 16 until the liquid accommodation portion 33 is replenished with a liquid.

In a state in which complement printing is executed, and the liquid accommodation amount is less than the first liquid threshold value, the control portion 19 may prohibit use of the image reading portion 16 until the liquid accommodation portion 33 is filled with a liquid. In a state in which complement printing is not executed, and the liquid accommodation amount is less than the first liquid threshold value, the control portion 19 may enable use of the image reading portion 16 whether or not the liquid accommodation portion 33 is replenished with a liquid.

In other words, in a state in which the liquid accommodation amount is less than the first liquid threshold value or the second liquid threshold value and there is no possibility of reduction in product quality, the control portion 19 enables use of the image reading portion 16 whether or not the liquid accommodation portion 33 is replenished with a liquid. In a state in which the liquid accommodation amount is less than the first liquid threshold value or the second liquid threshold value and there is possibility of reduction in product quality, the control portion 19 prohibits use of the image reading portion 16 until the liquid accommodation portion 33 is replenished with a liquid.

Effects of Second Exemplary Embodiment

Advantages of the present exemplary embodiment are described.

(6) In a state in which there is possibility of reduction in product quality, the control portion 19 prohibits use of the image reading portion 16 until the liquid accommodation portion 33 is replenished with a liquid. When replenishment with a liquid is performed, measures can be taken against possibility of reduction in product quality. Therefore, a risk of reduction in product quality can be lowered.

(7) When complement printing is executed, the control portion 19 prohibits use of the image reading portion 16 until the liquid accommodation portion 33 is replenished with a liquid. Therefore, measures against an ejection failure of the nozzle 41 can be taken before the image reading portion 16 is used.

(8) In a case in which the power source is turned on in the anti-freezing mode, when the liquid accommodation amount is less than the second liquid threshold value, the control portion 19 prohibits use of the image reading portion 16 until the liquid accommodation portion 33 is replenished with a liquid. Therefore, a risk of applying vibration to the liquid ejection portion 22 in a state in which the nozzle 41 is filled with a liquid can be lowered.

Modifications

The present exemplary embodiment can be modified and implemented as follows. The present exemplary embodiment and the following modifications can be combined and implemented within a technically consistent range.

- The control portion 19 may prohibit use of the image reading portion 16 until a user mounts the liquid accommodation portion 33 to the liquid mounting portion 21 in a brand-new liquid ejection apparatus 11 or replenishes the liquid accommodation portion 33 with a liquid. In some cases, a liquid used for inspection at the time of manufacturing may remain in the supply flow path 23 and the liquid ejection portion 22. The remaining liquid is dried over time, which may cause a risk of degrading liquid filling ability. In view of this, use of the image reading portion 16 is prohibited, and mounting of the liquid accommodation portion 33 or liquid filling is suggested. Thus, degradation of product quality can be suppressed.
- The liquid mounting portion 21 and the liquid accommodation portion 33 may be provided so as to be movable with the liquid ejection portion 22.

At least one of the liquid accommodation amount and the waste liquid accommodation amount may be calculated by the control portion 19, based on the number of liquid droplets ejected from the liquid ejection portion 22, the number of times and a type of cleaning, and the like. In other words, the control portion 19 may function as the liquid detection portion 34 and the waste liquid detection portion 35.

At least one of the liquid detection portion 34 and the waste liquid detection portion 35 may include a contact sensor that detects contact of a liquid. The liquid detection portion 34 and the waste liquid detection portion 35 may each include an electrode to detect a resistance that is changed due to contact of a liquid.

At least one of the liquid detection portion 34 and the waste liquid detection portion 35 may include a prism, an irradiation portion, and a light reception portion. The irradiation portion irradiates the prism with light. The light reception portion receives light refracted by the prism. When a liquid contacts with the prism, light is dispersed in the liquid, and an amount of light received by the light reception portion is changed. The liquid detection portion 34 and the waste liquid detection portion 35 may detect an amount of a liquid, based on a change of an amount of light received by the light reception portion.

At least one of the liquid detection portion 34 and the waste liquid detection portion 35 may include an image sensor that detects an image. The liquid detection portion 34 and the waste liquid detection portion 35 may detect a position of a liquid surface by analyzing an image detected by the image sensor.

At least one of the liquid detection portion 34 and the waste liquid detection portion 35 may include a photoelectric sensor including a light emission portion that performs irradiation with light and a light reception portion that receives light. The light emission portion and the light reception portion may be provided to sandwich the liquid accommodation portion 33 or the waste liquid accommodation portion 36 therebetween. The light reception portion may receive light that passes through the liquid accommodation portion 33 or the waste liquid accommodation portion 36. When a liquid is present between the light emission portion and the light reception portion, the liquid blocks light. The liquid detection portion 34 and the waste liquid detection portion 35 may detect a position of a liquid surface, based on a change of an amount of light received by the light reception portion. The light reception portion may detect a position of a liquid surface by receiving light reflected by a liquid.

At least one of the liquid detection portion 34 and the waste liquid detection portion 35 may include a float sensor that detects a position of a float on a liquid.

The liquid detection portion 34 may detect the liquid accommodation amount by measuring a weight of the liquid accommodation portion 33. The waste liquid detection portion 35 may detect the waste liquid accommodation amount by measuring a weight of the waste liquid accommodation portion 36.

The liquid detection portion 34 may detect the liquid accommodation amount for each of the plurality of liquid accommodation portions 33. The control portion 19 may compare a minimum liquid accommodation amount of a plurality of liquid accommodation amounts with the liquid threshold value.

The waste liquid accommodation portion 36 may be fixed to the liquid ejection apparatus 11.

The liquid ejection apparatus 11 may not include the selection portion 15. The mode during the power-off state may not be switched. The control portion 19 may execute power-off after moving the cap 27 to the contact position.

The selection portion 15 may be a switch capable of performing switching between the normal mode and the anti-freezing mode.

The liquid ejection apparatus 11 may include a thermometer that detects a temperature. The control portion 19 may perform switching between the normal mode and the anti-freezing mode, based on a temperature detected by the thermometer. In other words, the control portion 19 may function as a selection portion.

When the power source is turned off in the anti-freezing mode, and then the power source is subsequently turned on, the control portion 19 may compare the waste liquid accommodation amount and the waste liquid threshold value with each other. When the waste liquid accommodation amount exceeds the waste liquid threshold value, the control portion 19 may instruct a user to replace the waste liquid accommodation portion 36, and may prohibit use of the image reading portion 16 until the waste liquid accommodation portion 36 is replaced.

The ejection failure detection portion 25 may be a sensor that detects a liquid ejected from the nozzle 41. The sensor may be an electrode sensor including an electrode that detects contact of an ejected liquid, or may be an optical sensor that detects a liquid through use of light.

When the ejection failure detection portion 25 detects an ejection failure, the control portion 19 may compare the liquid accommodation amount and the first liquid threshold value with each other. In a state in which an ejection failure is not detected, and the liquid accommodation amount is less than the first liquid threshold value, the control portion 19 may enable use of the image reading portion 16 whether or not the liquid accommodation portion 33 is replaced or whether or not the liquid accommodation portion 33 is replenished with a liquid. In a state in which the ejection failure detection portion 25 detects an ejection failure, and the liquid accommodation amount is less than the first liquid threshold value, the control portion 19 may prohibit use of the image reading portion until the liquid accommodation portion 33 is replaced or the liquid accommodation portion 33 is replenished with a liquid.

The liquid ejection apparatus 11 may be a liquid ejection apparatus that jets or ejects a liquid other than ink. The state of the liquid ejected from the liquid ejection apparatus in a form of a minute amount of droplet is assumed to include a particulate form, a teardrop form, and a thread like extending form. This liquid referred herein may any material that can be ejected from the liquid ejection apparatus. For example, the liquid may be any matter in a state of being in a liquid phase, and is assumed to include a liquid body having high or low viscosity, as well as a fluid body such as sol, gel water, other inorganic solvents, an organic solvent, a solution, a liquid resin, a liquid metal, and a metal melt. The liquid includes not only liquid as a single state of the substance, but also includes particles of a functional material made of a solid such as pigment or metal particles dissolved in a solvent, dispersed or mixed in a solvent, and the like. Typical examples of the liquid include ink described in the embodiment above, liquid crystal, and the like. This ink is assumed to include a general aqueous ink and a solvent ink, as well various liquid compositions such as gel ink and hot-melt ink. Examples of the liquid ejection apparatus include an apparatus that ejects a liquid including, in a dispersed or dissolved form, a material such as an electrode material and a color material used in manufacture of liquid crystal displays, electroluminescent displays, surface emitting displays, color filters and the like in a dispersed or dissolved form. The liquid ejection apparatus may be an apparatus that ejects bioorganic substances used for biochip manufacturing, an apparatus used as a precision pipette and ejecting a liquid to be a sample, a printing apparatus, a micro dispenser, or the like. The liquid ejection apparatus may be an apparatus that ejects lubricant to a precision machine such as a clock or a camera in a pinpoint manner, or an apparatus that ejects a transparent resin liquid such as ultraviolet cure resin or the like on a substrate for forming a tiny hemispherical lens, optical lens, or the like used for an optical communication element and the like. The liquid ejection apparatus may be an apparatus that ejects an etching liquid such as an acid or an alkali for etching a substrate or the like.

Definitions

The expression “at least one” used in the present specification indicates “one or more” desired choices. As an example, when the number of choices is two, the expression “at least one” used in the present specification indicates “only one choice” or “both of the two choices”. In another example, when the number of choices is three or more, the expression “at least one” used in the present specification indicates “only one choice” or “a combination of any two or more choices”.

Supplementary Notes

Hereinafter, technical concepts and effects thereof that are understood from the above-described embodiments and modified examples are described.

(A) A liquid ejection device includes a liquid ejection portion configured to eject a liquid from a plurality of nozzles onto a medium to perform printing, a liquid mounting portion to which a liquid accommodation portion configured to accommodate a liquid to be supplied to the liquid ejection portion is removably mounted, an image reading portion configured to read an image, and a control portion, wherein the control portion enables use of the image reading portion whether or not the liquid accommodation portion is replaced, in a state in which a liquid accommodation amount being an amount of a liquid accommodated in the liquid accommodation portion is less than a liquid threshold value, and there is no possibility of reduction in product quality, and prohibits use of the image reading portion until the liquid accommodation portion is replaced, in a state in which the liquid accommodation amount is less than the liquid threshold value, and there is possibility of reduction in product quality.

With this configuration, when there is no possibility of reduction in product quality, the control portion prohibits use of the image reading portion until the liquid accommodation portion is replaced. When the liquid accommodation portion is replaced, measures can be taken against possibility of reduction in product quality. Therefore, a risk of reduction in product quality can be lowered.

(B) The liquid ejection apparatus may further include an ejection failure detection portion configured to detect an ejection failure of the plurality of nozzles, wherein, when a nozzle for which the ejection failure is detected among the plurality of nozzles is defined as a failure nozzle, and a nozzle for which the ejection failure is not detected among the plurality of nozzles is defined as a normal nozzle, the control portion may execute complement printing for ejecting a liquid from the normal nozzle in place of the failure nozzle when the ejection failure detection portion detects the failure nozzle, may enable use of the image reading portion whether or not the liquid accommodation portion is replaced, in a state in which the complement printing is not executed, and the liquid accommodation amount is less than a first liquid threshold value, and may prohibit use of the image reading portion until the liquid accommodation portion is replaced, in a state in which the complement printing is executed, and the liquid accommodation amount is less than the first liquid threshold value.

With this configuration, when the failure nozzle is detected, the control portion executes complement printing. Thus, a state in which complement printing is executed is also a state in which an ejection failure is detected. It is difficult to restore a nozzle from an ejection failure over time. Thus, when the image reading portion is used in a state in which an ejection failure is detected, there may be a risk of reduction in product quality. In view of this, when complement printing is executed, the control portion prohibits use of the image reading portion until the liquid accommodation portion is replaced. Therefore, measures against an ejection failure of the nozzle can be taken before the image reading portion is used.

(C) The liquid ejection apparatus according to claim 1 may further include a cap configured to form a space in which the plurality of nozzles are open, a cleaning portion configured to execute cleaning by forcefully discharging a liquid from the plurality of nozzles via the space, and a selection portion configured to select a mode while power is off, wherein when an anti-freezing mode is selected through the selection portion, the control portion may cause the cleaning portion to discharge a liquid inside the plurality of nozzles, move the cap to a position where the space is not formed, and then execute power-off, may fill the plurality of nozzles with a liquid, and then enable use of the image reading portion in a case in which the liquid accommodation amount is not less than a second liquid threshold value when the power is subsequently turned on, and may prohibit use of the image reading portion until the liquid accommodation portion is replaced in a case in which the liquid accommodation amount is less than the second liquid threshold value when the power is subsequently turned on.

When the anti-freezing mode is selected, a liquid in the nozzle is discharged, and then the power source is turned off. For example, when the image reading portion is used in a state in which a liquid in the nozzle is discharged, an air enters the liquid ejection portion through the nozzle due to, for example, vibration. With this, there may be caused a risk of reduction in product quality. In view of this, with this configuration, in a case in which the power source is turned on in the anti-freezing mode, when the liquid accommodation amount is less than the second liquid threshold value, the control portion prohibits use of the image reading portion until the liquid accommodation portion is replenished with a liquid. Therefore, a risk of applying vibration to the liquid ejection portion in a state in which the nozzle is filled with a liquid can be lowered.

(D) A liquid ejection device includes a liquid ejection portion configured to eject a liquid from a plurality of nozzles onto a medium to perform printing, a liquid accommodation portion having a replenishing port for replenishment with a liquid and being configured to accommodate a liquid to be supplied to the liquid ejection portion, an image reading portion configured to read an image, and a control portion, wherein the control portion enables use of the image reading portion whether or not the liquid accommodation portion is replenished with a liquid, in a state in which a liquid accommodation amount being an amount of a liquid accommodated in the liquid accommodation portion is less than a liquid threshold value, and there is no possibility of reduction in product quality, and prohibits use of the image reading portion until the liquid accommodation portion is replenished with a liquid, in a state in which the liquid accommodation amount is less than the liquid threshold value, and there is possibility of reduction in product quality.

With this configuration, when there is possibility of reduction in product quality, the control portion prohibits use of the image reading portion until the liquid accommodation portion is replenished with a liquid. When replenishment with a liquid is performed, measures can be taken against possibility of reduction in product quality. Therefore, a risk of reduction in product quality can be lowered.

(E) The liquid ejection apparatus may further include an ejection failure detection portion configured to detect an ejection failure of the plurality of nozzles, wherein, when a nozzle for which the ejection failure is detected among the plurality of nozzles is defined as a failure nozzle, and a nozzle for which the ejection failure is not detected among the plurality of nozzles is defined as a normal nozzle, the control portion may execute complement printing for ejecting a liquid from the normal nozzle in place of the failure nozzle when the ejection failure detection portion detects the failure nozzle, may enable use of the image reading portion whether or not the liquid accommodation portion is replenished with a liquid, in a state in which the complement printing is not executed, and the liquid accommodation amount is less than a first liquid threshold value, and may prohibit use of the image reading portion until the liquid accommodation portion is replenished with a liquid, in a state in which the complement printing is executed, and the liquid accommodation amount is less than the first liquid threshold value.

With this configuration, when complement printing is executed, the control portion prohibits use of the image reading portion until the liquid accommodation portion is replenished with a liquid. Therefore, measures against an ejection failure of the nozzle can be taken before the image reading portion is used.

(F) The liquid ejection apparatus may further include a cap configured to form a space in which the plurality of nozzles are open, a cleaning portion configured to execute cleaning by forcefully discharging a liquid from the plurality of nozzles via the space, and a selection portion configured to select a mode while power is off, wherein, when an anti-freezing mode is selected through the selection portion, the control portion may cause the cleaning portion to discharge a liquid inside the plurality of nozzles, move the cap to a position where the space is not formed, and then execute power-off, may fill the plurality of nozzles with a liquid, and then enable use of the image reading portion in a case in which the liquid accommodation amount is not less than a second liquid threshold value when the power is subsequently turned on, and may prohibit use of the image reading portion until the liquid accommodation portion is replenished with a liquid in a case in which the liquid accommodation amount is less than the second liquid threshold value.

With this configuration, in a case in which the power source is turned on in the anti-freezing mode, when the liquid accommodation amount is less than the second liquid threshold value, the control portion prohibits use of the image reading portion until the liquid accommodation portion is replenished with a liquid. Therefore, a risk of applying vibration to the liquid ejection portion in a state in which the nozzle is filled with a liquid can be lowered.

(G) A liquid ejection apparatus may include a liquid ejection portion configured to eject a liquid from a plurality of nozzles onto a medium to perform printing, a waste liquid mounting portion on which a waste liquid accommodation portion configured to accommodate a liquid being a waste liquid discharged from the liquid ejection portion is removably mounted, and a control portion, wherein the control portion may enable use of the image reading portion whether or not the waste liquid accommodation portion is replaced, in a state in which a waste liquid accommodation amount being an amount of a liquid accommodated in the waste liquid accommodation portion exceeds a waste liquid threshold value, and there is no possibility of reduction in product quality, and may prohibit use of the image reading portion until the waste liquid accommodation portion is replaced, in a state in which the waste liquid accommodation amount exceeds the waste liquid threshold value, and there is possibility of reduction in product quality.

A waste liquid may be generated while taking measures against possibility of reduction in product quality. In view of this, with this configuration, when the waste liquid accommodation amount exceeds the waste liquid threshold value, the control portion prohibits use of the image reading portion until the waste liquid accommodation portion is replaced. Therefore, a risk that a waste liquid flows out from the waste liquid accommodation portion can be lowered.

(H) The liquid ejection apparatus may further include a cap configured to form a space in which the plurality of nozzles are open, and a cleaning portion configured to execute cleaning by forcefully discharging a liquid from the plurality of nozzles via the space, wherein the control portion may execute an operation of discharging a liquid from the cap, and then enable use of the image reading portion in a case in which the waste liquid accommodation amount does not exceed the waste liquid threshold value when power is turned on after the liquid ejection apparatus is unplugged in the middle of execution of the cleaning by the cleaning portion, and may prohibit use of the image reading portion until the waste liquid accommodation portion is replaced in a case in which the waste liquid accommodation amount exceeds the waste liquid threshold value when the power is turned on after the liquid ejection apparatus is unplugged in the middle of execution of the cleaning by the cleaning portion.

When the liquid ejection apparatus is unplugged in the middle of execution of cleaning, a liquid may remain in the cap in some cases. When the image reading portion is used in a state in which a liquid remains in the cap, there may be a risk of liquid leakage due to vibration. In view of this, with this configuration, when the waste liquid accommodation amount does not exceed the waste liquid threshold value when the power is turned on, the control portion discharges a liquid from the cap. When the waste liquid accommodation amount exceeds the waste liquid threshold value, use of the image reading portion is prohibited until the waste liquid accommodation portion is replaced. Therefore, a risk that a liquid leaks from the cap can be lowered.

What is claimed is:

1. A liquid ejection apparatus, comprising:

a liquid ejection portion configured to eject a liquid from a plurality of nozzles onto a medium to perform printing;

a liquid mounting portion to which a liquid accommodation portion configured to accommodate a liquid to be supplied to the liquid ejection portion is removably mounted;

an image reading portion configured to read an image; and a control portion, wherein the control portion enables use of the image reading portion whether or not the liquid accommodation portion is replaced, in a state in which a liquid accommodation amount being an amount of a liquid accommodated in the liquid accommodation portion is less than a liquid threshold value, and there is no possibility of reduction in product quality, and prohibits use of the image reading portion until the liquid accommodation portion is replaced, in a state in which the liquid accommodation amount is less than the liquid threshold value, and there is possibility of reduction in product quality.

2. The liquid ejection apparatus according to claim 1, comprising:

an ejection failure detection portion configured to detect an ejection failure of the plurality of nozzles, wherein when a nozzle for which the ejection failure is detected among the plurality of nozzles is defined as a failure nozzle, and a nozzle for which the ejection failure is not detected among the plurality of nozzles is defined as a normal nozzle, the control portion executes complement printing for ejecting a liquid from the normal nozzle in place of the failure nozzle when the ejection failure detection portion detects the failure nozzle, enables use of the image reading portion whether or not the liquid accommodation portion is replaced, in a state in which the complement printing is not executed, and the liquid accommodation amount is less than a first liquid threshold value, and prohibits use of the image reading portion until the liquid accommodation portion is replaced, in a state in which the complement printing is executed, and the liquid accommodation amount is less than the first liquid threshold value.

3. The liquid ejection apparatus according to claim 1, comprising:

a cap configured to form a space in which the plurality of nozzles are open;

a cleaning portion configured to execute cleaning by forcefully discharging a liquid from the plurality of nozzles via the space; and a selection portion configured to select a mode while power is off, wherein when an anti-freezing mode is selected through the selection portion, the control portion causes the cleaning portion to discharge a liquid inside the plurality of nozzles and moves the cap to a position where the space is not formed, and then turns off power, fills the plurality of nozzles with a liquid, and then enables use of the image reading portion in a case in which the liquid accommodation amount is not less than a second liquid threshold value when the power is subsequently turned on, and prohibits use of the image reading portion until the liquid accommodation portion is replaced in a case in which the liquid accommodation amount is less than the second liquid threshold value when the power is subsequently turned on.

4. A liquid ejection apparatus, comprising:

a liquid ejection portion configured to eject a liquid from a plurality of nozzles onto a medium to perform printing;

a liquid accommodation portion having a replenishing port for replenishment with a liquid and being configured to accommodate a liquid to be supplied to the liquid ejection portion;

an image reading portion configured to read an image; and a control portion, wherein the control portion enables use of the image reading portion whether or not the liquid accommodation portion is replenished with a liquid, in a state in which a liquid accommodation amount being an amount of a liquid accommodated in the liquid accommodation portion is less than a liquid threshold value, and there is no possibility of reduction in product quality, and prohibits use of the image reading portion until the liquid accommodation portion is replenished with a liquid, in a state in which the liquid accommodation amount is less than the liquid threshold value, and there is possibility of reduction in product quality.

5. The liquid ejection apparatus according to claim 4, comprising:

an ejection failure detection portion configured to detect an ejection failure of the plurality of nozzles, wherein when a nozzle for which the ejection failure is detected among the plurality of nozzles is defined as a failure nozzle, and a nozzle for which the ejection failure is not detected among the plurality of nozzles is defined as a normal nozzle, the control portion executes complement printing for ejecting a liquid from the normal nozzle in place of the failure nozzle when the ejection failure detection portion detects the failure nozzle, enables use of the image reading portion whether or not the liquid accommodation portion is replenished with a liquid, in a state in which the complement printing is not executed, and the liquid accommodation amount is less than a first liquid threshold value, and prohibits use of the image reading portion until the liquid accommodation portion is replenished with a liquid, in a state in which the complement printing is executed, and the liquid accommodation amount is less than the first liquid threshold value.

6. The liquid ejection apparatus according to claim 4, comprising:

a cap configured to form a space in which the plurality of nozzles are open;

a cleaning portion configured to execute cleaning by forcefully discharging a liquid from the plurality of nozzles via the space; and a selection portion configured to select a mode while power is off, wherein when an anti-freezing mode is selected through the selection portion, the control portion causes the cleaning portion to discharge a liquid inside the plurality of nozzles and moves the cap to a position where the space is not formed, and then turns off power, fills the plurality of nozzles with a liquid, and then enables use of the image reading portion in a case in which the liquid accommodation amount is not less than a second liquid threshold value when the power is subsequently turned on, and prohibits use of the image reading portion until the liquid accommodation portion is replenished with a liquid in a case in which the liquid accommodation amount is less than the second liquid threshold value.

7. A liquid ejection apparatus, comprising:

a liquid ejection portion configured to eject a liquid from a plurality of nozzles onto a medium to perform printing;

a waste liquid mounting portion on which a waste liquid accommodation portion configured to accommodate a liquid being a waste liquid discharged from the liquid ejection portion is removably mounted; and a control portion, wherein the control portion enables use of the image reading portion whether or not the waste liquid accommodation portion is replaced, in a state in which a waste liquid accommodation amount being an amount of a liquid accommodated in the waste liquid accommodation portion exceeds a waste liquid threshold value, and there is no possibility of reduction in product quality, and prohibits use of the image reading portion until the waste liquid accommodation portion is replaced, in a state in which the waste liquid accommodation amount exceeds the waste liquid threshold value, and there is possibility of reduction in product quality.

8. The liquid ejection apparatus according to claim 7, comprising:

a cap configured to form a space in which the plurality of nozzles are open; and a cleaning portion configured to execute cleaning by forcefully discharging a liquid from the plurality of nozzles via the space, wherein the control portion executes an operation of discharging a liquid from the cap, and then enables use of the image reading portion in a case in which the waste liquid accommodation amount does not exceed the waste liquid threshold value when power is turned on after the liquid ejection apparatus is unplugged in the middle of execution of the cleaning by the cleaning portion, and prohibits use of the image reading portion until the waste liquid accommodation portion is replaced in a case in which the waste liquid accommodation amount exceeds the waste liquid threshold value when the power is turned on after the liquid ejection apparatus is unplugged in the middle of execution of the cleaning by the cleaning portion.

* * * * *